United States Patent
Habusha et al.

(10) Patent No.: US 10,255,213 B1
(45) Date of Patent: Apr. 9, 2019

(54) ADAPTER DEVICE FOR LARGE ADDRESS SPACES

(71) Applicant: Amazon Technologies, Inc., Seattle, WA (US)

(72) Inventors: Adi Habusha, Moshav Alonei Abba (IL); Itai Avron, Petah Tikva (IL); Yaakov Gendel, Haifa (IL)

(73) Assignee: Amazon Technologies, Inc., Seattle, WA (US)

( * ) Notice: Subject to any disclaimer, the term of this patent is extended or adjusted under 35 U.S.C. 154(b) by 409 days.

(21) Appl. No.: 15/083,113

(22) Filed: Mar. 28, 2016

(51) Int. Cl.
G06F 13/38 (2006.01)
G06F 13/40 (2006.01)
G06F 5/10 (2006.01)
G06F 3/06 (2006.01)

(52) U.S. Cl.
CPC ............ *G06F 13/385* (2013.01); *G06F 3/068* (2013.01); *G06F 3/0613* (2013.01); *G06F 3/0656* (2013.01); *G06F 5/10* (2013.01); *G06F 13/4022* (2013.01)

(58) Field of Classification Search
CPC ...... G06F 13/385; G06F 3/0613; G06F 3/068; G06F 5/10; G06F 13/4022
USPC .......................................................... 710/56
See application file for complete search history.

(56) References Cited

U.S. PATENT DOCUMENTS

| | | | | |
|---|---|---|---|---|
| 7,206,865 B2* | 4/2007 | Creta | ................... | G06F 13/4027 710/5 |
| 8,468,278 B2* | 6/2013 | Radhakrishnan | ... | G06F 13/1631 710/107 |
| 9,921,954 B1* | 3/2018 | Sabbag | ............... | G06F 12/0246 |
| 9,959,214 B1* | 5/2018 | Habusha | ............. | G06F 12/1009 |
| 2005/0135159 A1* | 6/2005 | Inoue | ........................ | G06F 5/10 365/189.05 |
| 2009/0031058 A1* | 1/2009 | Radhakrishnan | ... | G06F 13/1631 710/53 |
| 2010/0011145 A1* | 1/2010 | Carver | ................ | H04L 67/2852 710/310 |
| 2011/0179217 A1* | 7/2011 | Hsiao | ................... | G06F 12/0246 711/103 |
| 2012/0151118 A1* | 6/2012 | Flynn | ................... | G06F 11/1008 711/6 |
| 2013/0086301 A1* | 4/2013 | Cleveland | ............. | G06F 3/0689 711/103 |
| 2013/0097369 A1* | 4/2013 | Talagala | .............. | G06F 12/0246 711/103 |

(Continued)

*Primary Examiner* — Christopher B Shin
(74) *Attorney, Agent, or Firm* — Kilpatrick Townsend & Stockton LLP

(57) ABSTRACT

Provided are methods and adapter devices for buffering write transactions directed to a large space. In various implementations, an adapter device may include a sequential address buffer and a memory. A region of the memory may be configured as a data block, which may be associated with an address range. The address range may correspond to a region of an address space of a target device. The adapter device may be configured to receive a write transaction, the write transaction having an address and data. The adapter device may further write the address to the sequential address buffer. The adapter device may further determine that the address is within the address range, and to write the data to the data block. The adapter device may further, upon the occurrence of an event, write the data from the data block to the region of the address space of the target device.

24 Claims, 9 Drawing Sheets

(56) References Cited

U.S. PATENT DOCUMENTS

2013/0227201 A1* 8/2013 Talagala .............. G06F 12/0246
711/103
2017/0046274 A1* 2/2017 Oportus Valenzuela ....................
G06F 12/1036

* cited by examiner

ADAPTER DEVICE FOR LARGE ADDRESS SPACES

BACKGROUND

In a computing system, a host device frequently accesses system memory. The system memory may be local random access memory (RAM) or read-only memory (ROM), or may include the address space of a peripheral device. The term memory-mapped Input/Output (MMIO) may be used to describe an address space in a peripheral device that is mapped into the system memory along with RAM and ROM.

Write transactions from a host device may be as small as one byte. System memory implemented using RAM or ROM may be addressable at the level of one byte, and so can efficiently accept and process one-byte write transactions. Peripheral devices used for memory-mapped I/O, however, may have a minimum write size of multiples of bytes, or possibly kilobytes. This is because these peripheral devices may be more efficient when write transactions are at least this minimum size. Computing systems thus often have an adapter device that manages write transactions from the host device that are directed to memory-mapped I/O.

BRIEF DESCRIPTION OF THE DRAWINGS

Various embodiments in accordance with the present disclosure will be described with reference to the drawings, in which.

DETAILED DESCRIPTION

Figure 1:
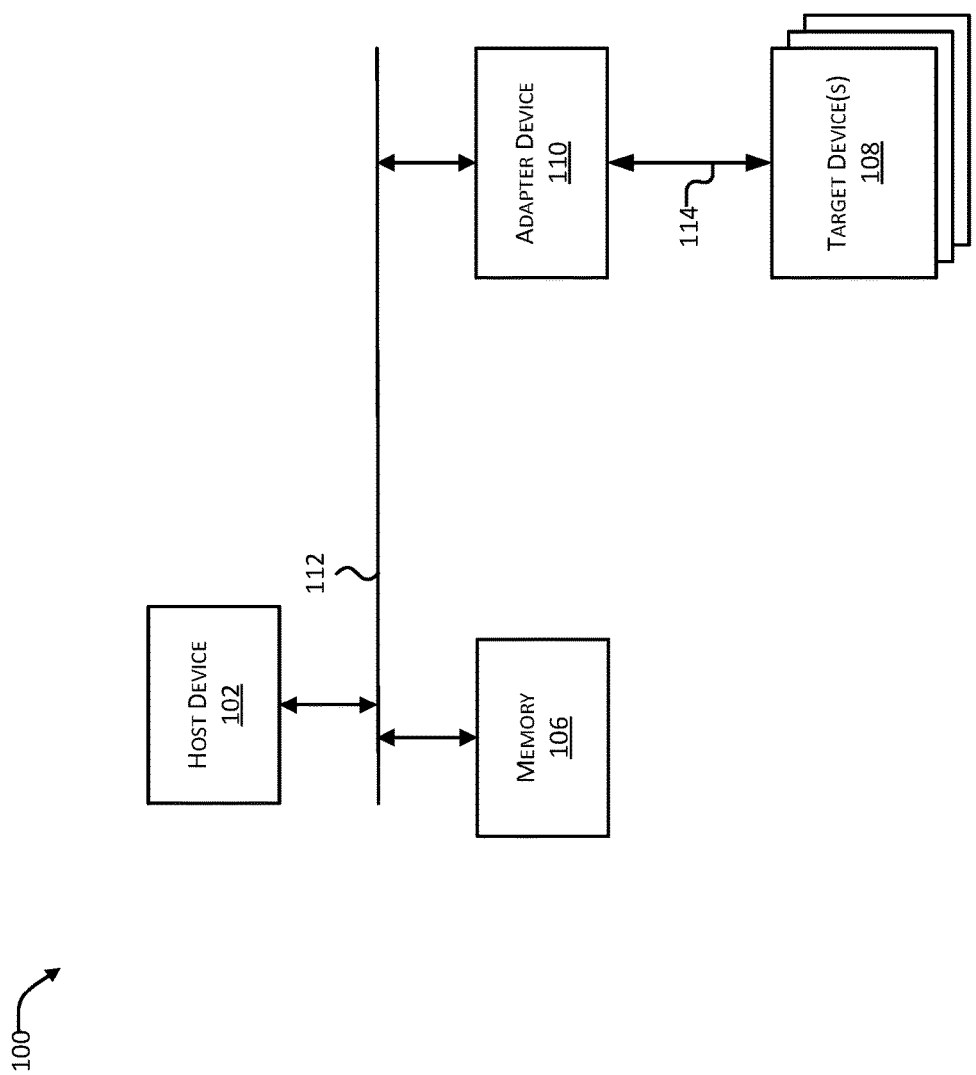
FIG. 1 illustrates an example of a computing system including a host device and one or more target devices.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

In a computing system, a host device frequently accesses system memory. Program code for applications and data being operated upon may be stored in system memory. The system memory may be local random access memory (RAM) or read-only memory (ROM), or may include the address space of a peripheral device. A peripheral device is a device that can be added to a computing system, and which adds some functionality to the computing system. When a peripheral device is added to a computing system, often the peripheral device is available for use by the computing system upon adding some software to the computing system, called a driver. Often, a peripheral device can also be removed without affecting the basic operation of the computing system. In some cases, peripheral devices can be added or removed while the computing system is powered on, a process often called "hot-swapping" or "hot-plugging."

When the address space of a peripheral device is included in the system memory of a computing device, the address space and/or the peripheral device may be referred to as memory-mapped Input/Output (memory-mapped I/O or MMIO). Various peripheral devices can be added to a computing system to provide memory-mapped I/O, including storage devices, network interfaces, graphics processing devices, and other I/O devices. Storage devices add volatile and/or non-volatile memory to a computing system. Examples of peripheral storage devices include flash drives, floppy disk drives, tape drives, optical disk drives, and hard drives. Examples of hard drives include magnetic drives and solid state drives (SSDs). Network interfaces provide access to network resources, such as network-attached storage devices, file servers, compute servers, web servers, and/or the Internet. Graphics processing devices and other I/O devices may process data for output, for example, to monitors, printers, projectors, and so on. Both network resources and peripheral devices locally attached to a computing system may be target devices for memory-mapped I/O transactions.

I/O transactions from a host device may write data as small as one byte. System memory implemented using RAM or ROM may be addressable at the level of one byte, and so can efficiently accept and process one-byte write transactions. Target devices used for memory-mapped I/O, however, may have a minimum write size of multiples of bytes, or possibly of several kilobytes. This is because, in some cases, these target devices may be more efficient when write transactions are at least this minimum size. Alternatively or additionally, a target device may be more efficient when write transactions that would otherwise be scattered across the target device's address space are delivered to the target device sequentially. The rate at which data can be written to a target device is frequently limited by the time needed to transfer the write transaction to the target device (the data rate), the time needed for the target device to locate the part of address space being written to (average access time), and possibly also the amount of time needed to write the data to the target device. In some cases, mechanical limitations affect the rate at which a target device is able to process write transactions. In some cases, a target device may have a minimum write data size because of a mechanical limitation, or for an arbitrary reason.

When the host device executes a write transaction that is less than a target device's minimum write size, it may sometimes be necessary to first read a block of data from the target device that includes the address of the write transaction. Once the block of data has been read, the host device can write to the part of the data block that is at the address of the write transaction. Then the host device would write the data block back to the target device. These steps may be necessary to avoid overwriting data in the data block other than the data at the address specified by the write transaction. This process is usually referred to as a read-modify-write.

Executing a read-modify-write operation adds a large burden to a host device, particularly when the host device frequently executes very small write transactions (e.g., one byte in size). Computing systems thus often have an adapter device that manages write transactions from the host device to memory-mapped I/O. The adapter device may buffer write transactions, and send write transactions to the target device in blocks. The adapter device may also manage read-modify-write operations, or may avoid the necessity of doing a read-modify-write by buffering write transactions directed to the same region of the target device's address space.

Adapter devices for memory-mapped I/O are typically designed for throughput speed, and thus typically require fast memory. Fast memories, however, typically have a much smaller address space than do target devices. The address space of a target device may be, for example, on the order of hundreds of gigabytes (GB) to multiples of terabytes (TB). In contrast, the address space of an adapter device is typically much smaller, such as for example around one hundred gigabytes or less. While large, fast memories are available, even the largest memories will be smaller than the address space of a target device.

Thus an adapter device typically includes memory management functionality, to manage the difference between the size of its memory versus the size of a target device's address space. One simple memory management method is for the memory on the adapter device to represent a region of the address space of the target device, where the region is the same size as the memory of the adapter device. For example, the target device's address space may be 1 TB, while the memory on the adapter device is 128 GB. The adapter device may map its 128 GB to a 128 GB region within the 1 TB address space. Using this simple method, however, the adapter device would be unable to buffer write transactions to addresses that are outside the 128 GB region of the address space. For write transactions that are outside the 128 GB region, the adapter device would need another solution.

In various implementations, an adapter device may thus buffer write transactions in two different ways. First, the adapter device may be configured with one or more data blocks of a certain size. Each data block may be associated with a region of the address space of a target device that is the same size as the data block. Put another way, each data block is mapped to a region of the target device's address space. Second, the adapter device may have a sequential data buffer. When the adapter device receives a write transaction from a host device, the adapter device may determine whether the transaction address is within the address space of one of the data blocks. When this is the case, the adapter device may write the transaction data to the appropriate data block. When the transaction address is outside the address space of all the data blocks, then the adapter device may place the write data into the data buffer. The adapter device may also have a sequential address buffer that stores addresses for all of the transactions received by the adapter device, possibly with other information about the transactions.

In various implementations, the adapter device may further periodically send the buffered data to the target device. The contents of a data block may be sent to the target device upon the occurrence of an event, such as the expiration of a timer. The contents of the data buffer may be read and written to the target device upon the occurrence of a different event, such as the number of entries in the data buffer reaching a threshold. The address buffer may be read concurrently, to obtain the addresses for the data stored in the data buffer. In some cases, the adapter device may, upon reading the contents of the data buffer, put data that is within the same region of the address space of the target device together into a single transaction to the target device.

In various implementations, the adapter device may further periodically change the address space region that is mapped by a data block. To determine what area of a target device's address space that should be mapped to a data block, the adapter device may look at the addresses in the address buffer. The addresses in the address buffer may indicate that the host device is frequently accessing a particular region of the target device's address space that is not presently mapped to a data block. This region may be selected to be mapped. Furthermore, a data block that maps to a region of the address space that is not being used very frequently by the host device may be associated with the newly selected region.

In various implementations, the adapter device's buffering functionality may be configurable. For example, the size of the data blocks, the regions of address space mapped by the data blocks, the frequency for sending data from the data blocks to the target device, and the frequency for sending data from the data buffer to memory, among other things, may be configurable.

An adapter device implemented as described above may provide an efficient and flexible interface between a host device and target devices with large memories. The adapter device may be able to buffer write transactions of any size while also being able to generate transactions to a target device that allow the target device to be used more efficiently. The adapter device may further be able to adjust for the transaction speed of the host device, the write speed of the target device, and the host device's use of the target device's address space.

FIG. 1 illustrates an example of a computing system 100 including a host device 102 and one or more locally-attached target devices 108. The host device 102 generates memory transactions and places those memory transactions onto a host bus 112. The example computing system 100 also includes local memory 106 that may accept memory transactions from the host device 102 over the host bus 112. The example computing system 100 also includes an adapter device 110, which may also accept memory transactions over the host bus 112. The adapter device 110 may manage exchange of data between the host device 102 and the target devices 108 that result from the memory transactions. The adapter device 110 may communicate with the target devices 108 over a physical communication medium 114.

The host device 102 may be a processor sub-system, including at least one processor or a device including multiple embedded processors. Alternatively or additionally, the host device 102 may be a computer, such as a server computer, a desktop computer, a laptop, a distributed computing system, or some other system including at least a processor. The host device 102 may execute software, including an operating system, applications, and/or virtual machines each hosting a virtual operating system and applications.

The local memory 106 may be volatile RAM or non-volatile ROM or a combination of different memory types. The host device 102 may use the memory 106 to store, for example, operating system code, application code, and/or data operated on by the operating system and/or applications. The host device 102 may send read and write transactions to the memory 106 over the host bus 112. The host bus 102 may implement a standard or proprietary protocol. For example, the host bus 102 may implement one of the Peripheral Component Interconnect (PCI) family of bus protocols. As used herein, the term "PCI" describes a family of related, standard bus protocols. The PCI family includes the original PCI standard, PCI-eXtended (PCI-X), Accelerated Graphics Port (AGP), PCI Express (PCIe, also referred to as PCI-XP), and other extensions to the PCI standard. The term "PCI" as used herein may be used to describe any protocol in the PCI family of bus protocols.

In some implementations, an adapter device 110 provides a memory-mapped I/O interface between the host device 102 and the target devices 108. That is, the adapter device 110 may allow the host device 102 to interact with the target devices 108 the same way that the host device 102 interacts with local memory 106. The adapter device 110 may thus accept read and write transactions from the host device 102 in the same way as does the memory 106. Transactions to the adapter device 110 thus may be indistinguishable from transactions to the memory 106, except for the addresses used. In some implementations, the adapter device 110 may be integrated into the host device 102.

The target devices 108 may include various directly-connected peripheral devices, such as storage devices, graphics processing devices, security processing devices, I/O devices, and/or other devices that include processing engines (e.g. encryption/decryption engines, compression/decompression engines, etc.) The target devices 108 are "directly-connected" in that the target devices 108 are physically connected to the computing system 100, as opposed to being connected to the computing system 100 over a network, as in FIG. 2. The target devices 108 of FIG. 1 may each have address space. Generally, each target device 108 will accept host device 102 transactions with addresses that fall within its address space, and may ignore all others in most, but not all, circumstances. Alternatively or additionally, one or more target devices 108 may together have a single address space. An address space may include, for example, the addresses of one or more memories on a target device 108. Alternatively or additionally, the address space may include a target device's 108 addressable registers or tables. In some cases, an address space may include a target device's 108 physical addresses, virtual addresses, or both physical and virtual addresses. In various implementations, the combined address space of all the target devices 108 may be very large, such as on the order of multiple terabytes.

The target devices 108 may implement a standard bus protocol. Examples of bus protocols used by target devices 108 include the PCI-based family of bus protocols, Non-Volatile Memory Express (NVMe, also referred to as Non-Volatile Memory Host Controller Interface, or NVMHCI), Advanced Host Controller Interface (AHCI), Small Computing System Interface (SCSI), Serial Attached SCSI (SAS), Serial Advanced Technology Attachment (SATA), and Parallel Advanced Technology Attachment (PATA), among others. These bus protocols may also be referred to herein as local bus protocols. Some, such as NVMe, may also be referred to as storage protocols.

The adapter device 110 of this example communicates with the target devices 108 over a communication medium 114. The communication medium 114 may be a physical cable, a printed circuit board, or a combination of cables and circuit boards. In many cases, the communication medium 114 is also standardized, where the standard provides, for example, the number of wires, the shape of any connectors, power requirements, and so on. In such cases, the communication medium 114 may be attached to any peripheral device that implements the same standard. In many cases, the communication medium 114 is specified by the protocol implemented by the target devices 108. The communication medium 114 may, in certain contexts, also be referred to as a bus.

The one or more target devices 108 in this have volatile or non-volatile data storage memory, or both volatile and non-volatile memory. "Non-volatile" describes memory that retains stored data when the target device 108 is not powered. Non-volatile memory may also be referred to as persistent memory. In contrast, "volatile" memory retains stored data only so long as it has power. Examples of non-volatile storage devices include magnetic disk drives, optical disk drives, tape drives, and solid state drives (SSD), among others.

As noted above, the computing system 100 may include more than one target device 108. When the computing system 100 includes more than one target device 108, each target device 108 may have its own communication medium 114 with the adapter device 110. Alternatively or additionally, two or more of the target devices 108 may share one communication medium 114. Alternatively or additionally, two or more of the target devices 108 may be connected in series, with additional communication mediums, with one or both ends of the chain connected to the adapter device 110.

Figure 2:
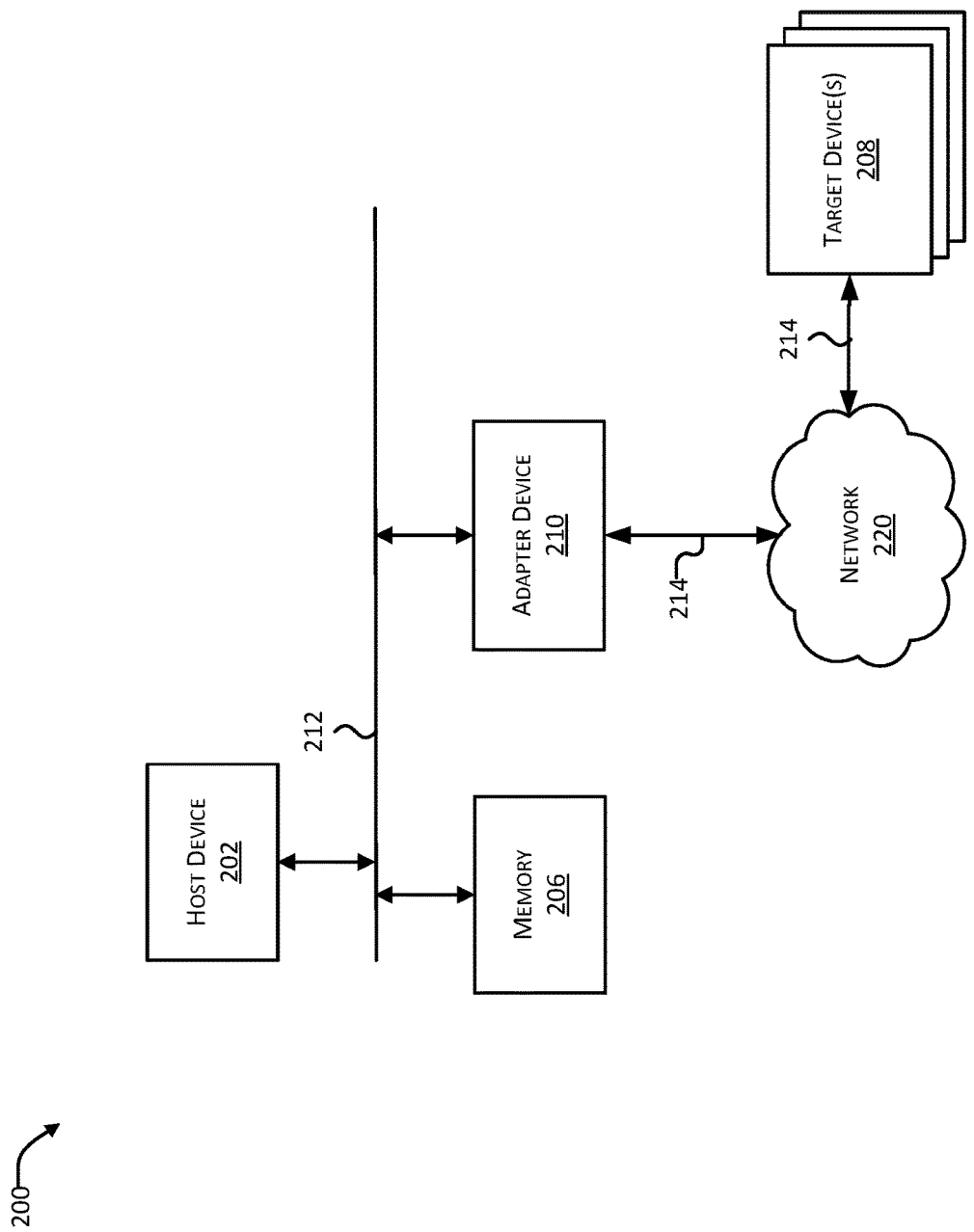
FIG. 2 illustrates another example computing system that includes a host device and one or more target devices.

FIG. 2 illustrates another example computing system 200 that includes a host device 202 and one or more target devices 208, here attached to the computing system 200 over a network 22. The host device 202 may generate memory transactions and place those memory transactions onto a host bus 212. The example computing system 200 also includes local memory 206, which may accept memory transactions from the host device 202 over the host bus 212. The example computing system 200 also includes an adapter device 210, which may also accept memory transactions over the host bus 212. The adapter device 210 may manage the exchange of data between the host device 202 and the target devices 208 that result from the memory transactions. The adapter device 210 may communicate with the target devices 208 over a network connection 214 and a network 220.

In some implementations, the adapter device 210 provides a memory-mapped I/O interface between the host device 202 and the target devices 208. That is, the adapter device 210 allows the host device 202 to interact with the target devices 208 the same way that the host device 202 interacts with local memory 206. Thus the adapter device 210 may accept read and write transactions from the host device 202 in the same way as does the memory 206. Transactions to the adapter device 210 thus may be indistinguishable from transactions to the memory 206, except for the addresses used. In some implementations, the adapter device 210 may be integrated into the host device 202.

The adapter device 210 in this example communicates with the target devices 208 over a network 220. The network 220 may include some number of routers, switches, hubs, and other network infrastructure. In some cases, the network 220 may also include other networks, including both public and private networks. The adapter device 210 may have a network connection 214 to the network 220. The network connection 214 may implement a network protocol, such as Transmission Control Protocol/Internet Protocol (TCP/IP), User Datagram Protocol/Internet Protocol (UDP/IP), Infiniband, or Remote Direct Memory Access (RDMA) over Converged Ethernet (RoCE). Alternatively or additionally, the network protocol can include a network storage protocol (e.g., iSCSI, NVMe-over-fabric (NVMf), or another protocol) that facilitates accessing a storage device over a network. The adapter device 210 may translate transactions from the host device 202 into packets, and may further send those packets over the network 220 to the target devices 208. The target devices 208 may also have a network connection 214, over which they can receive packets containing transactions from the adapter device 210 and send data back to the adapter device 210. In some implementations, the target devices 208 may translate the packets from a network protocol to a storage protocol prior to processing the contents of the packets.

The target devices 208 may include various resources that may be found on a network. For example, the target devices 208 may include storage arrays, file servers, compute servers, web servers, cloud services, I/O devices, and/or destinations on the Internet, among others. Each target device 208 may have an address space, which defines the range of addresses that the host device 202 can use to access each target device 208. Alternatively or additionally, one or more of the target devices 202 may have a combined address space. In some implementations, the adapter device 210 may keep track of the address spaces of the target devices 208. Alternatively or additionally, the adapter device 210 may manage the address spaces for the target devices 208, including assigning address spaces to particular target device 208 and/or maintaining a mapping between addresses that can be used by the host device 202 and the addresses for accessing the target devices 208.

In some implementations, multiple target devices 208 may reside at the same location on the network 220, meaning that they have the same network address. In some cases, the multiple target devices 208 at this one location may be accessible as one, unified address space. In some cases, each target device 208 may be accessible as individual address spaces. In some implementations, target devices 208 may reside at multiple locations on the network 220. In some cases, the target devices 208 at each network location may be accessible as a unique address space. In some cases, target devices 208 at different network locations may be accessible as one address space. In various implementations, the combined address space of all the target devices may be very large, such as on the order of multiple terabytes.

Though not illustrated here, in some implementations, a computing system may include both direct-attached and network-attached target devices. In these implementations, each target device may have its own address space. Alternatively or additionally, one or more target devices, possibly including both direct-attached and network-attached target devise, may have one combined address space.

Figure 3:
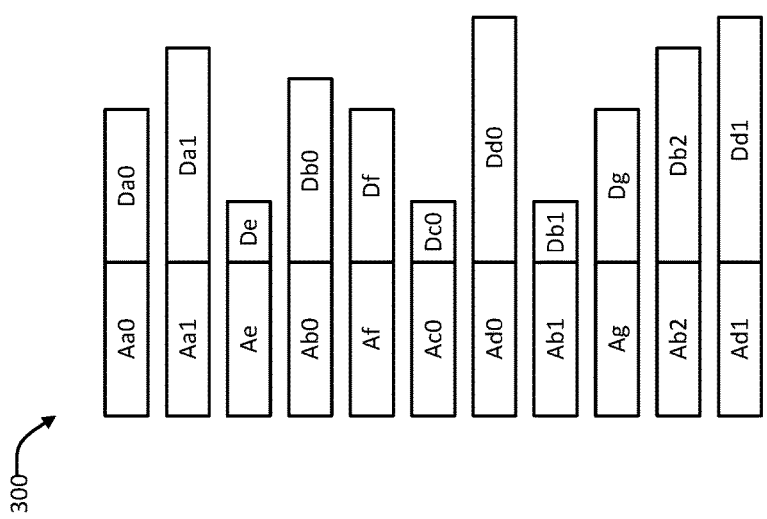
FIG. 3 illustrates an example of a sequence of write transactions that may be received by the adapter device.

As noted above, the adapter device may buffer write transactions for a host device, and send the buffered write data to target devices in larger blocks. FIG. 3 illustrates an example of a sequence of write transactions 300 that may be received by the adapter device, for purposes of illustrating the example described below. Each write transaction includes an address, the portion labeled "A," and data, the portion labeled "D." The address and data may also be referred to herein as the transaction address and transaction data. As illustrated, the data portion of the various write transactions 300 may differ in length. The write transactions 300 are shown in the order that they are received by an adapter device, with the first transaction at the top and the last transaction at the bottom.

In some implementations, the adapter device may receive the address and data for a single write transaction in two write transactions, one each for the address and the data. For example, some target devices are configured to be accessed by a host device using an indirect access, in which the address and data are received separately. Because the adapter device functions as an interface to these target devices, the adapter device may also receive a write transaction in two separate transactions. In these implementations, the host bus protocol generally defines a way to match a write address with its associated data, so that the adapter device understands which data goes with which address. While only write transactions are provided in this example, the adapter device may also receive read transaction interspersed between the write transactions 300.

Figure 4:
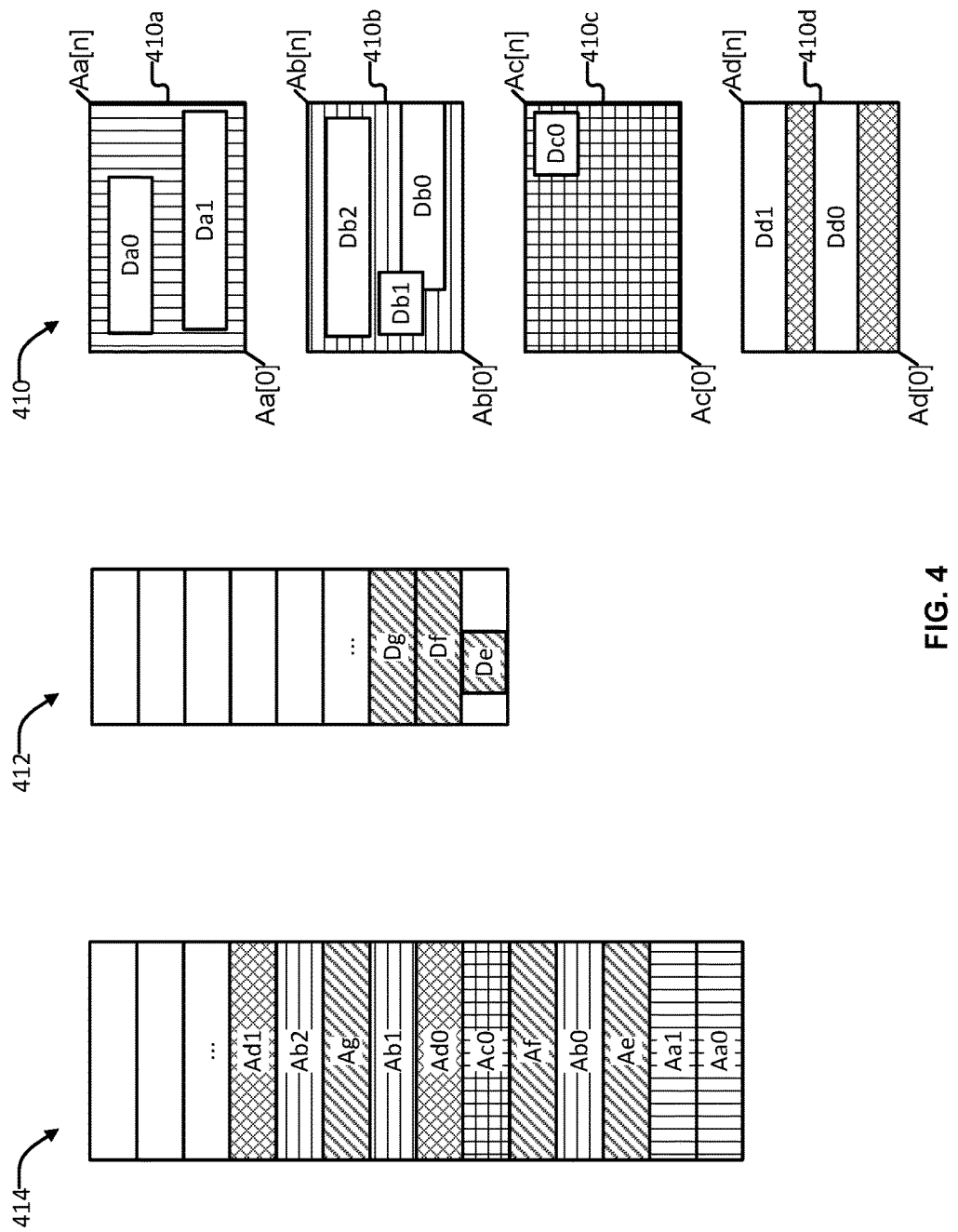
FIG. 4 illustrates an example of the methods that the adapter device may use to buffer write transactions.

FIG. 4 illustrates an example of the methods that the adapter device may use to buffer write transactions. The adapter device may use two buffer structures for temporarily storing data: first, one or more data blocks 410 and second, a sequential data buffer 412. The adapter device may also separately store transaction addresses in an address buffer 414.

The data blocks 410 each represent a block of data storage space with a contiguous address range. For example, a data block 410 may represent 4 kilobytes (KB) of data storage space, with an address range of 0 to 4095 (decimal), assuming that each byte is individually addressable. In the illustrated example, the adapter device has been configured with four data blocks 410a-d. The address range of the first data block 410a has been labeled Aa[0]-Aa[n], to represent address 0 to n. The address ranges of the second 410b, third 410c, and fourth 410d data blocks have been labeled Ab[0]-Ab[n], Ac[0]-Ac[n], and Ad[0]-Ad[n], respectively.

As described in further detail below, each data block 410 is associated with a region of the address space of one or more target devices. That is, the addresses within each data block 410 map to addresses in the address space. The adapter device may have configuration registers and/or a memory to maintain the mapping of data block 410 addresses to target device addresses. In some implementations, the adapter device can store a mapping for just the start address of each data block and the length or size of the data block 410. Alternatively or additionally, the adapter device may store a start address and an end address for each data block 410.

In various implementations, the adapter device may be configured with one data block or multiple data blocks. When the adapter device has multiple data blocks 410, they may all be the same size (e.g., 2 KB, 4 KB, 1 MB, etc.) or may be different sizes. The size of the data blocks 410 may be based on a number of factors, such as the minimum write size for the target device(s), the rate at which writes can be processed by the target device(s), the rate at which write transactions are received by the target device, statistics describing how the host device is using the available address space, and so on. In some implementations, the size of the data blocks 410 may be configurable, for example, by a host device and/or by a configuration file. In some implementations, multiple sizes for the data blocks 410 can be specified. In some implementations, the data blocks 410 can be disabled, for example, using a valid bit and/or by setting their size to zero.

The data blocks 410 provide a straightforward way to buffer write data. As discussed below, the adapter device may use the write transaction's address to select a data block 410, and then use the transaction address to determine a location within the selected data block to write the transaction data. The data blocks 410 also provide a simple way to write the data they are storing to the address space of a target device: all or some of the data from each data block 410 can be transferred in one transaction or a series of transactions to the target device. In this transaction or transactions, the target device can be provided with the start address of a data block 410 to use as the start address for placing the data form the data block.

As noted above, the storage capacity of the adapter device is typically much smaller than the address space of target devices. Thus, in some implementations, the adapter device may perform an address translation, to convert a transaction address into an address that is within the address spaces of the data blocks 410. For example, given a transaction address of 0x11_00001234 (hexadecimal) and assuming that the appropriate data block 410 is 4 KB in size, the transaction address may be translated to 0x234 (hexadecimal). In some implementations, the adapter device may translate the transaction address based on how the data blocks 410 are implemented. For example, the appropriate data block 410 may be implemented as a region in a memory, and thus have a starting address of 0xa000 within the memory. In this example, the adapter device may translate the transaction address 0x11_00001234 to 0xa234, assuming that the data block is 4 KB in size.

The second mechanism that the adapter device may use to buffer write transactions is a sequential data buffer 412. In various implementations, the data buffer 412 operates on a first-in, first-out basis, such that the first data written to the data buffer 412 is the first data that is read out. The adapter device may add data to the data buffer 412 in the order that the transactions that include the data are received. In contrast to the data blocks 410, the transaction data in the data buffer 412 is thus organized according to time of arrival, rather than being organized according to a transaction address.

In various implementations, each entry in the data buffer 412 stores the data for one write transaction. The data buffer 412 may thus be configured such that each entry can store as much as the maximum allowable transaction data size that is supported by a host bus protocol. The data in each data buffer 412 entry may thus be, for example, as little as one byte and as much as 256 bytes, assuming 256 bytes is the maximum amount of data that may be received for any write transaction.

A sequential data buffer 412 is straightforward to implement, particularly when it is not necessary to maintain a relationship between the data being stored, other than the order in which the data was received. For example, the data buffer 412 can be implemented as a circular buffer. Furthermore, in most cases, the adapter device will write the oldest data that it is buffering to a target device first, which is another reason that the sequential structure of the data buffer 412 may be convenient. In some implementations, the entries in the data buffer 412 vary with the size of the data. For example, one entry in the data buffer may contain only one byte, and thus be only one byte wide, while the next entry is 256 bytes wide, to store 256 bytes of data.

The data blocks 410 and the data buffer 412 only store transaction data. Hence, the adapter device may also have a sequential address buffer 414 for storing transaction addresses. The address buffer 414 may also operate on a first-in, first-out basis, and thus store the transaction address for each transaction as it is received. In some implementations, the address buffer 414 stores addresses for all transactions, including both read transactions and write transactions. In some implementations, the address buffer 414 stores addresses for only the transactions whose data is stored in the data buffer 412, or only for transactions whose data is stored in the data blocks 410.

As described below, the address buffer 414 may have multiple purposes. First, as noted above, the address buffer 414 stores addresses for the transactions whose data is written into the data buffer 412. Thus, when data in the data buffer 412 is to be transferred to a target device, the address buffer 414 can provide the address to which the data should be transferred. In some implementations, the address buffer 414 may also serve as a log of the write transactions, that is, a temporary history of the write transactions' addresses being used by the host device. As discussed below, this information may be used by the adapter device for various purposes, including for more efficiently buffering and processing write transactions.

In addition to a transaction address, in some implementations, the entries in the address buffer 414 may also store additional information. For example, the address buffer 414 may store the size of the data for a transaction, a timestamp indicating a time at which the transaction was received, byte or bit enables, valid bits, a transaction type (e.g., read, write, or some other type), and/or other information about a transaction that may be provided by the host bus protocol. In some implementations, for write transactions whose data are stored in the data blocks 410, the address buffer 414 may store both the original transaction address and a translated address, where the translated address provides the data's location in a data block 410. In these implementations, the address buffer 414 may also store, for example, a data block 410 address or identifier, which indicates in which data block 410 the associated data can be found.

In some implementations, the adapter device may use the information stored in the address buffer 412 to perform various actions. For example, the adapter device may examine the addresses and any associated transaction information to profile transactions sent by the host device. Profiling the transactions may include, for example, looking for patterns in the transactions, checking the bandwidth being used by the host device, and/or determine the host device's usage pattern of target devices. As another example, the adapter device may examine the contents of the address buffer to monitor activity by the host device. Monitoring may include generate logs of host device transactions, raising alerts with the host device's activity transaction behavior deviates from expected parameters, and/or watching for and possibly also stopping apparent security breaches, such as denial of service attacks. As another example, the adapter device may examine the contents of the address buffer to pre-fetch data. Pre-fetching data may include fetching data for queued but not yet processed read transactions. Pre-fetching data may also include identifying an active address space region of a target device, and fetching the region from the target device. As another example, the adapter device may examine the contents of the address buffer to provide protection for the address space of a target device. The address space of a target device may need to be protected, for example, when the host device attempts to write un-writeable regions, when the host device attempts to read secure regions, or when the host device appears to be flooding a target device with transactions at a rate that could cause harm to the target device, among other reasons.

In various implementations, the adapter device may have one or more memories, such as random access memories, into which the data blocks 410, data buffer 412, and address buffer 414 can be configured. For example, the adapter device may have a memory, where regions of the memory have been designated as data blocks 410. In some implementations, another region of the same memory may be configured as the data buffer 412, and another region may be designated as the address buffer 414. In some implementations, the adapter device may have multiple memories, on each for one or more of the data blocks 410, data buffer 412, and address buffer 414. Memories in the adapter device may be dynamic RAM (DRAM), synchronous DRAM (SDRAM), double data rate DRAM (DDR), Rambus DRAM (RDRAM), or some other type of random access memory. In most cases, the adapter device uses non-persistent memory, such that the transactions that the adapter device stores are not retained once the power is turned off.

In some implementations, the adapter device may have purpose-built hardware for one or more of the data blocks 410, data buffer 412, and address buffer 414. This purpose-built hardware may be implemented, for example, in an Application Specific Integrated Circuit (ASIC) or a Field-Programmable Gate Array (FPGA). Alternatively or additionally, one or more of the data blocks 410, data buffer 412, and address buffer 414 may be implemented in firmware, and the adapter device may include integrated circuitry on which the firmware runs.

The example of FIG. 4 also illustrates how the sequence of write transactions 300 illustrated in FIG. 3 may be buffered by the adapter device. As illustrated in FIG. 4, for each write transaction, the adapter device may first determine whether the transaction address falls within the address range of one of the data blocks 410. To make this determination, the adapter device may have configuration registers or some storage memory that describes the address range of each data block 410. For example, the adapter device may track the start address and end address of the regions of a target device's address space that are mapped by each data block 410. The adapter device may store the target device's addresses because determining whether a transaction address is within a data block may then require only a greater than and less than operation (e.g. if Aa[0] is less than or equal to the transaction address, and the transaction address is less than or equal to Aa[n], then the transaction address is within the first data block 410a). Alternatively or additionally, the adapter device may store the start address and the size of each data block 410. In some implementations, the adapter device may alternatively or additionally store the addresses where the data blocks 410 reside in its own memory. In these implementations, the adapter device may first translate a transaction address into an address that is in the address range of the data blocks 410, and then determine whether the translated address is within one of the data blocks.

In the illustrated example, the first two transactions, with addresses Aa0 and Aa1, were found to be in the address space of the first data block 310a. The adapter device has thus written the associated data, Da0 and Da1, into the data block 310a, using the addresses Aa0 and Aa1 to determine where in the data block 310 the data should be written. Furthermore, the addresses Aa0 and Aa1 (and possibly also some transaction-related information) were written into the address buffer 414, in the order in which they were received.

The third transaction in this example is not in any of the four data blocks 410a-d. When the address of a transaction (here Ae), does not fall within the address range of any of the data block 410, the adapter device may write the data for the transaction (here De), into the data buffer 412. In this way, write transactions to a part of a target device's address space that is not currently mapped into a data block 410 are captured by the data buffer 412. The address is also written into the address buffer 414.

The adapter device may process each of the subsequent write transactions in this way, placing transaction data whose associated address is within the address range of a data block 410 into that data block 410, data whose associated address is outside the address rage of all the data blocks 410 into data buffer 412, and transaction addresses into the address buffer 414. In this example, the addresses Ab0, Ab1, and Ab2 fall into the address range of the second data block 410b, and the associated data, Db0, Db1, and Db2 are written into that data block 410b. The address Ac0 is in the address range of the third data block 410c; so the associated data Dc0 is written into data block 410c. The addresses Ad0 and Ad1 are in the address range of the fourth data block 410d, and the associated data, Dd0 and Dd1, are written into data block 410d. Finally, the addresses Af and Ag are outside the address ranges of all the data blocks 410, and thus their associated data is written into the data buffer 412.

In some cases, the adapter device may receive data that overwrites some or all of data previously written into a data block 410 (see, e.g., data Db0 and Db1). Until a data block 410 is transferred to a target device, write transactions may overwrite data already written into a data block 410, since subsequent write transactions have newer data that makes the previously stored data out-of-date.

While the data blocks 410 and the data buffer 412 have been described in terms of how they are used when the adapter device receives write transactions, in all likelihood the adapter device will also receive read transactions. Read transactions typically have only an address, specifying a location in the address space of a target device from which the host device is requesting data. In some cases, a read transaction may have data, such as for example when the read is a read-and-compare transaction. In these cases, the transaction data may be compared in some way with the data read from the target device, and some result from the comparison may be returned to the host device.

In some implementations, the data requested by the read transaction may be found in the data blocks 410 or the data buffer 412. For example, when the address for a read transaction is within the address range of one of the data blocks 410, the adapter device may retrieve the data from the data block 410. In some implementations, the data blocks 410 may have the latest data from a target device's address space, in addition to having the most recent data provided by write transactions. The data can typically also be retrieved from the data blocks 410 faster than from the target device. Alternatively, when the address for a read transaction is outside the address ranges of all the data blocks 410, the data may instead be found in the data buffer 412. For example, upon receiving a read transaction, the adapter device may review the addresses in the address buffer 414 to see if a matching write address can be found. When a matching write address is found, the adapter device may subsequently or concurrently retrieve the data for that write transaction from the data buffer 412. Should no matching address be found, and the data cannot be retrieved from a data block 410, then the adapter device may request the data from the target device. In some implementations, the adapter device may examine the address buffer 414 for read transactions whose addresses fall within a same address space region, where the size of the region may be a minimum read transaction size for a target device. When a sufficient number of read transactions are found that fall within the same region, the adapter device may read the region in one block from the target device. Reading a block of data from the target device may be more efficient than reading the data for each read transaction separately.

In some implementations, the addresses for read transactions may be added to the address buffer 414, possibly with information about the read transaction, and possibly also with comparison data, in cases where the read transaction has comparison data (in some implementations, the comparison data may be placed in the data buffer 412). In some implementations, a read transaction may be handled only once the address for the read transaction reaches the head of the address buffer 414, meaning the requested data may be located only when the read transaction is at the head of the address buffer 414. Once the adapter device locates the data, the adapter device may return the data in a response to the host transaction. In some implementations, the read transactions may be prioritized, such that the data may be located and/or fetched before the read transaction's address reaches the head of the address buffer 414. For example, the adapter device may locate and/or fetch the requested data as soon as the read transaction is received. In these implementations, the requested data may be placed in the data buffer 412, so that when the read transaction's address reaches the head of the address buffer 412, the corresponding data is available in the data buffer 412. The data in the data buffer 412 may then be sent to the host device in a response to the corresponding read transaction.

As noted above, the adapter device is a temporary buffer for transactions directed by a host device to the address space of a target device. Thus the adapter device periodically writes the data in the data blocks 410 and the data buffer 412 to the target device.

The adapter device may transfer the data from one or more of the data blocks 410 to a target device upon the occurrence of an event. In various implementations, the event used by the adapter device may be configurable. An example of an event, in some implementations, is the expiration of a timer. The adapter device may have one timer for all the data blocks 410 or a timer for each data block 410. The timer may start, for example, when data is first written to a data block 410. The length of the timer may be based on, for example, how fast a data block 410 can be written to memory, the rate of incoming write transactions, and/or how much time has passed since the last time data was written to the data block 410, among other things. In some implementations, the rate at which the data in the data blocks 410 is transferred to a target device may be configurable.

In some implementations, the adapter device may be configured to take turns transferring data from each data block 410 to a target device. For example, the adapter device may select each data block 410 in a round-robin order. In these implementations, the event that causes a data block's 410 data to be transferred may be that it is a data block's 410 turn to have its data transferred to a target device. In some implementations, the adapter device may check whether a data block 410 has received any write transactions before writing the data in the data block to a target device, so that data blocks 410 that are not storing new data are not transferred.

In some implementations, rather than using a round-robin order, the adapter device may select the data block 410 with the oldest data for next transferring to a target device. In these implementations, the event that causes a data block's 410 data to be transferred may be that the data block 410 becomes the data block 410 with the oldest data, or that the data block 410 is selected by the adapter device based on having the oldest data.

In some implementations, the data in a data block 410 may be transferred to a target device when a certain amount of data has been written into the data block 410. In these implementations, the event that causes a data block's 410 data to be transferred may be that the amount of data written to a data block has reached a threshold. In some implementations, this threshold may be configurable.

In some implementations, the adapter device may transfer the data from a data block 410 to a target device because the adapter device wants to reuse the data block's 410 address range. As discussed below, the adapter device may occasionally change the region of a target device's address space that a data block's 410 address space maps to. When this occurs, it may be necessary to first transfer the data in the data block 410 to the target device. In this situation, the event that causes a data block's 410 data to be transferred may be that the data block 410 is being remapped.

As noted above, in some implementations, the size of the data blocks 410 may be selected to be the same as the minimum transaction size a target device. Alternatively or additionally, the data block size may be a multiple of the minimum transaction size. Using the minimum transaction sizes of the target device as the basis for the data block size enables the adapter device to transfer all of the contents of a data block to the target device using one transaction, or a series of transactions. In this way, the adapter device may attempt to make the most efficient use of its communication channel with the target device.

The data blocks 410 also may assist the adapter device in using a target device more efficiently by collecting together data from the host device. For example, the host device may be using addresses scattered across the address space of the target device. Transferring data in a contiguous block may serialize the data, such that the data is provided to the target device in a sequential order. Duplicate transactions to the same address may also be avoided. The data blocks 410 may also assist the adapter device in generating packets for network-attached target devices. In some cases, by collecting together transactions for adjacent or nearly adjacent addresses, the data blocks 410 may reduce the number of packets that the adapter device may otherwise have to generate.

The address for a transaction transferring data to a target device may be provided by a configuration register or storage memory that describes the address space region that a data block 410 maps to. For example, the adapter device may have a configuration register that stores the start address of the address space region that is associated with the start address of the data block 410.

In some implementations, the adapter device may transfer only a portion of the data from a data block 410 to a target device. For example, when only a part of the data block 410 has been written to, the adapter device may start a data transfer at the lowest address containing data, and may stop the data transfer at the highest address that contains data. In these implementations, the adapter device may have registers that maintain the lowest and highest addresses currently in use in a data block 410. These implementations may increase the efficiency of data transfers to a target device by reducing the amount of data that is to be written.

In some implementations, while the adapter device is transferring data from a data block 410 to a target device, the adapter device may prevent further writes to this data block. Transferring the data the target device may require some time, and during that time the adapter device may need to avoid collisions in the data block 410, that is, a read and a write of an address occurring at the same time. While writing to the data block 410 is prevented, data for write transactions whose addresses would otherwise map into the address range of this data block 410 may instead be put into the data buffer 412. When the data buffer 412 is read, the data for these transactions may be transferred to the data block 410 (assuming that the adapter device has finished writing the data from this data block to a target device). The adapter device may first verify that the data from the buffer 412 is newer than data in the data block 410, using, for example, transaction addresses and timestamps in the address buffer 414. When data in the data buffer 412 is older than data in the data block 410, then the data may be dropped. Alternatively, the data may be transferred directly to a target device, rather than to the data block 410. Alternatively, if the data block 410 has been remapped to a different region of the address space (as discussed below), then the data for these write transactions may also be data written directly to a target device.

The adapter device may also read the contents of the data buffer 412 upon the occurrence of an event, and write the contents to a target device. The adapter device may read only one entry, a few entries, or all entries that have data. In some implementations, which event the adapter device uses may be configurable. In some implementations, the event may be the expiration of a timer. In these implementations, the adapter device may read data from the data buffer 412 at a constant rate. The rate may be fixed, may be configured based on the rate of incoming write transactions, may be based on the rate at which data can be transferred to a target device, or may be adjusted according to the rate of data coming into and/or going out of the adapter device.

Alternatively or additionally, in some implementations, the event that causes data from the data buffer 412 to be transferred may be that the amount of data in the data buffer 412 has reached a threshold value, for example, eight entries filled or ten entries filled. Alternatively or additionally, the threshold may be based on a sum of the data stored in each entry having reached a threshold. Alternatively or additionally, in some implementations, the event may be that the number of addresses in the address buffer 414 has reached a threshold value, e.g., the address buffer 414 is nearly full.

In some implementations, the event that causes data from the data buffer 412 to be transferred may be based on addresses associated with the data in the data buffer 412. In these implementations, the adapter device may examine the addresses in the address buffer 414, and determine that some (whose associated data are in the data buffer 412) are within the same region of a target device's address space. The adapter device may further determine that this region of the address space is within the size or sizes designated for data blocks. For example, assuming that the data blocks 410 are each 1 KB, the address buffer may have several addresses that fall within the same 1 KB window.

When the adapter device determines that data from multiple entries in the data buffer 412 can be sent to a target device in one transaction, the adapter device may read the data buffer 412 to extract these entries. The adapter device may also read the address buffer 414 to remove the addresses for this data. The data buffer 412 is sequential, however; thus the data being extracted may be interspersed with data that is not within, to use the example above, the same 1 KB window. The adapter device may write this data to a target device in individual write transactions, using the associated address from the address buffer 414.

In some cases, before transferring some data from the data buffer to a target device, the adapter device may first read data from the target device. For example, assuming the minimum write transaction size for the target device is 1 KB, the adapter device may read 1 KB from the address space of the target device, where this 1 KB includes the address that is to be modified by the data from the data buffer 412. The adapter device may then modify the 1 KB to add to it the data from the data buffer 412, and then transfer the 1 KB back to the target device. This is a read-modify-write operation. The adapter device may execute a read-modify write when, for example, a target device does not enable the adapter device to write data that is less than the minimum write transaction size. In cases where a target device can accept writes of data that is less than its minimum write transaction size, then a read-modify-write operation may not be necessary.

In most cases, it may be desirable to transfer data to target devices continuously and as quickly as possible. In some cases, it may be necessary to transfer data as quickly as transactions are received from the host device. Data also should be transferred to a target device so that data in the target device's address space does not become out-of-date. When the adapter device is unable to keep up with the rate of transactions from the host device, in some implementations, the adapter device may have a flow control mechanism. The flow control mechanism may enable the adapter device to inform the host device to reduce the rate of incoming transactions, and/or to stop sending transactions completely.

In various implementations, the adapter device may choose between the data blocks 410 and the data buffer 412 to determine which data to next transfer to a target device. The adapter device may be configured to select between the data blocks 410 and the data buffer 412 so that the transfer of data to target devices is continuous and/or as quick as possible. In some implementations, the adapter device may take turns between transferring data from the data blocks 410 and the data buffer 412. In some implementations, the adapter device may select a data block 410 or the data buffer 412 based on which has the oldest data. In some implementations, the data blocks 410 and the data buffer 412 may raise an alert when ready to have its data sent to a target device, and the adapter device may arbitrate between them based on the order of the alerts, a priority, a timestamp, or some other factor.

In some implementations, an adapter device may be configured with an address buffer 414 and either data blocks 410 or a data buffer 412. For example, when the address space of the target devices is not exceptionally large, the adapter device may have sufficient memory to map all of the target devices' address space. In this example, the adapter device may be configured with only the data blocks 410 and the address buffer 414. As another example, in some cases, the adapter device need not collect data into data blocks, such as when the target devices can accept small write transactions. In this example, the adapter device may be configured with only the data buffer 412 and the address buffer 414.

In various implementations, the adapter device may include a processor that manages the operations of the adapter device. For example, the processor may execute program code that maintains the mappings of the data blocks' 410 address spaces to regions of the address space of target devices. As another example, the processor may execute program code that processes the data and addresses of transactions into the data blocks 410, data buffer 412, and address buffer 414. As another example, the processor may execute program code that translates transaction addresses into addresses within the address ranges of the data blocks 410. Alternatively or additionally, the adapter device may have a memory management unit that takes care of address translations. As another example, the processor may execute program code that selects between the data blocks 410 and data buffer 412, and transfers data from each to target devices. Alternatively or additionally, the adapter device may have a Direct Memory Access (DMA) engine to manage transferring data from the adapter device to target devices. Alternatively or additionally, in some implementations, the adapter device may have firmware, executing on an integrated circuit, which manages the operations of the adapter device. In some implementations, the adapter device may use a combination of program code executing on a processor and firmware to manage its operations.

Figure 5:
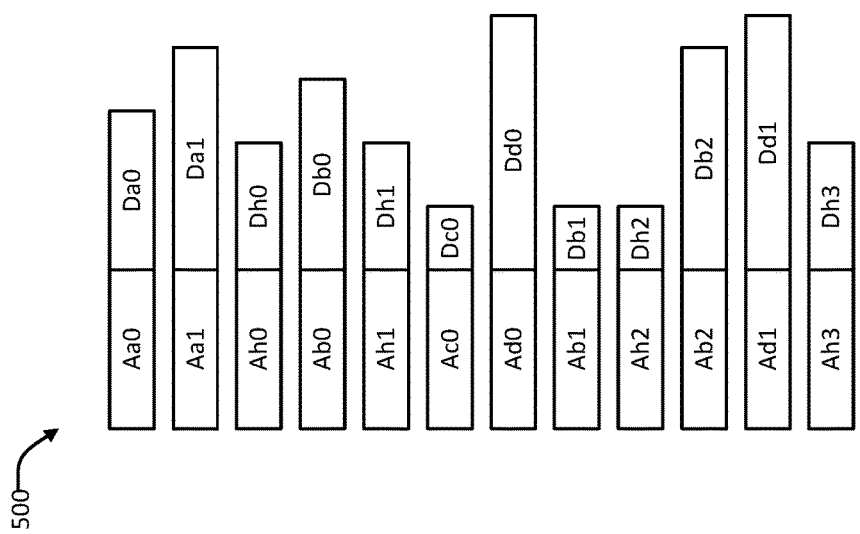
FIG. 5 illustrates another example of a sequence of write transactions that may be received by the adapter device.

FIG. 5 illustrates another example of a sequence of write transactions 500 that may be received by the adapter device, for purposes of illustrating the next example. Each write transaction includes an address, the portion labeled "A," and data, the portion labeled "D." As illustrated, the data portion of the various write transactions 500 may differ in length. The write transactions 500 are shown in the order that they are received by the adapter device, with the first transaction at the top and the last transaction at the bottom. While only write transactions are provided in this example, the adapter device may also receive read transaction interspersed between the write transactions 500.

Figure 6:
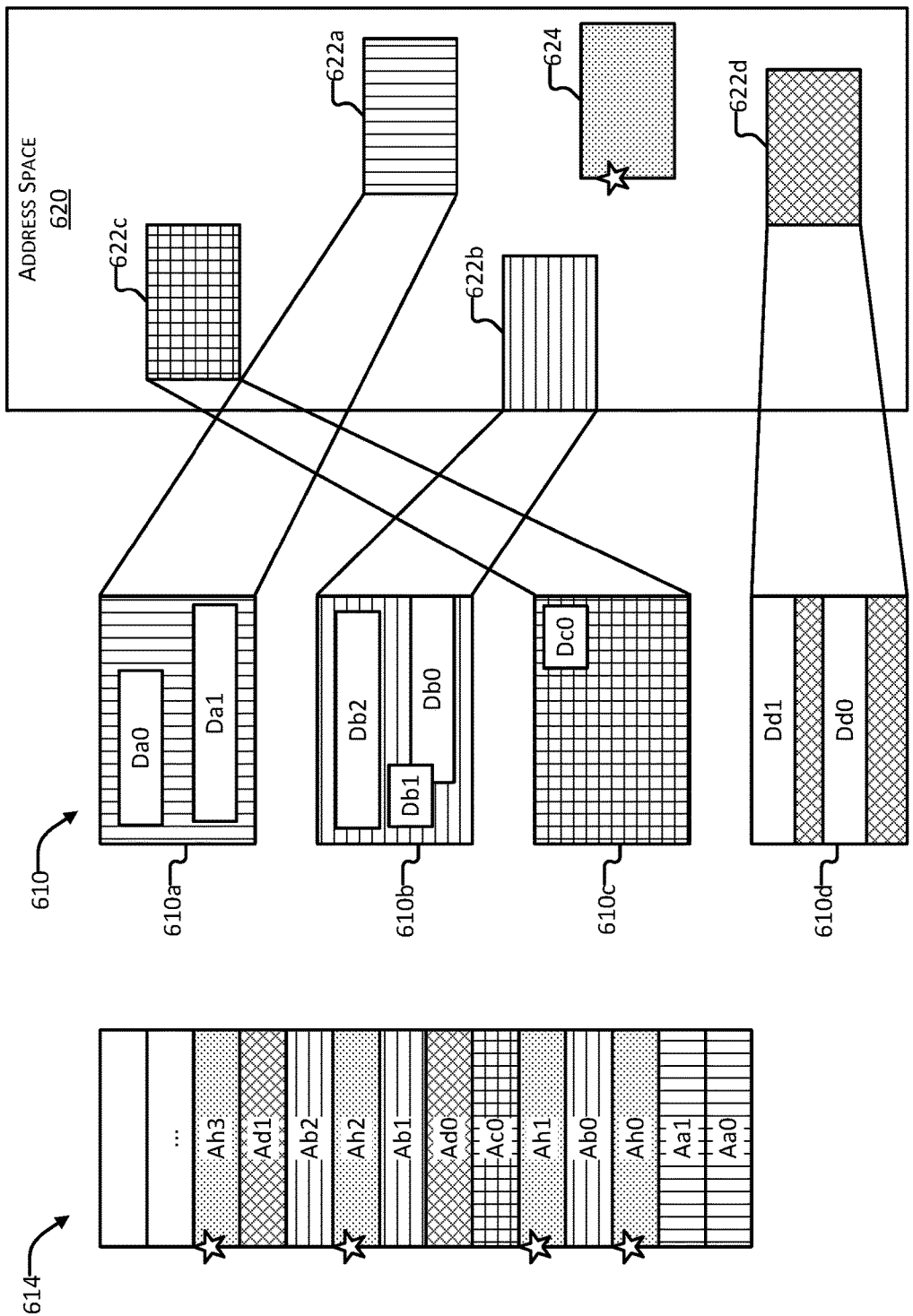
FIG. 6 illustrates an example of how data blocks may be associated with regions of a target device's address space.

As discussed above, the adapter device associates data blocks with regions of the address space of one or more target devices. FIG. 6 illustrates an example of how data blocks 610 may be associated with regions of the address space 620. As described above, the data blocks 610 are one method the adapter device may use to buffer transaction data, prior to transferring the data to the address space 620. Another method that the adapter device may use to buffer data is a data buffer, as described above and not illustrated here. To assist the buffering of data, the adapter device may also have an address buffer 614.

In the example of FIG. 6, the adapter device has been configured with four data blocks 610a-d. In various implementations, the adapter device may be configured with one data block 610 or multiple data blocks 610. In various implementations, the data blocks 610 may be the same size or may each be different sizes.

In various implementations, the data blocks 610 are each associated with a region of the address space 620 of one or more target devices. For example, in the illustrated example, the first data block 610a is associated with a region 622a in the address space 620, the second data block 610b is associated with a second region 622b, the third data block 610c is associated with a third region 622c, and the fourth data block 610c is associated with a fourth region 622d. For a data block 610 to be associated with a region of the address space 620 means that, for example, each address in the first data block 610a corresponds to an address in the first region 622a of the address space 620. This may mean that the region 622a of the address space 620 is the same size as the data block 610. In some cases, the region 622a may also have the same address alignment as the data block 610. In some cases, the data block 610a may also have the same data as the region 622a, except that the data block 610a may, until its data is transferred to the address space 620, have some newer data.

Though the addresses in the data block 610a correspond directly to the addresses in the region 622a of the address space 620, the addresses, however, are not necessarily the same. As discussed above, the adapter device's address space is likely much smaller than the address space of the address space 620 of the target devices. Hence the addresses the adapter device may use addresses that are translated from addresses in the address space 620.

As illustrated, the regions 622a-d of the address space 620 that are associated with the data blocks 610 may be located anywhere in the address space 620. Typically, however, the regions 622a-d correspond to areas of the address space 620 that are being accessed frequently by the host device. As discussed above, the data blocks 610 can be transferred to the address space 620 quickly, with one or a series of transactions, and often without having to execute a read-modify-write. Hence, the adapter device may attempt to map the data blocks 610 to regions of the address space 620 that the host device is using particularly actively. In this way, write data from the host device may be transferred quickly from the adapter device to target devices.

When the adapter device initially powers on, however, the adapter device may have no knowledge of what regions of the address space 620 the host device is going to be using. Hence, at power on, the adapter device may be configured to select default regions of the address space 620 to associate with the one or more data blocks 610. Alternatively or additionally, the host device may configure the data blocks' 610 associations with the address space 620 regions. Alternatively or additionally, the adapter device may have access to a configuration, for example in the host memory, which informs the adapter device of which address space 620 regions to associate with data blocks 610.

In various implementations, over time, the adapter device may change the regions of the address space 620 that are mapped by the data blocks 610 as the host device's use of the address space 620 changes. A particular region of the address space 620 may become more actively used by the host device, while another region becomes less actively used. For example, following receipt of the sequence of write transactions 500 illustrated in FIG. 5, each of the four data blocks 610a-d in FIG. 6 may have had some write data stored in them. An event may then occur, such as the expiration of a timer, which causes the adapter device to transfer the data from at least one data block, e.g., the third data block 610c, to its corresponding third region 622c in the address space 620. The adapter device may subsequently determine that another region of the address space 620, in this example the new region 624, has become particularly active. Alternatively, the adapter device may have made this determination prior to transferring the data from the data block 610c to the address space 620. In either case, adapter device may disassociate the third data block 610c from the third region 622c, and associate the third data block 610c with the newly active region 624 instead.

To determine that the newly active region 624 became actively used, in some implementations, the adapter device may look at the contents of the address buffer 614. For example, four transactions, having addresses Ah0, Ah1, Ah2, and Ah3, fall within the newly active region 624. In some implementations, the adapter device may examine the entries in the address buffer 614, and see that the host device has sent a number of write transactions to the new region 624. In some implementations, the adapter device may be configured with a threshold that indicates when a region is sufficiently active to be mapped to a data block 610. In these implementations, the threshold may be based on a number of transactions in the address buffer 614, an amount of data (as indicated by information stored in the address buffer 614), a frequency of transactions received for the newly active region 624, and/or a decrease in the frequency of transactions to the other regions 622a-d, among other things.

To continue the example above, the adapter device may associate the newly active region 624 with the third data block 610c, after having transferred the contents of the third data block 610c to the corresponding third region 622c in the address space 620. In some implementations, the adapter device may read data from the newly active region 624 into the third data block 610c upon making the association and before any data is written to the data block 610c. In some implementations, the data associated with the addresses Ah0, Ah1, Ah2, and Ah3, which would be in the data buffer, may be written to the newly active region 624 prior to the region 624 being associated with the third data block 610c. This may occur when the adapter device reads the data buffer and address buffer 614 to transfer data from the data buffer to the address space 620. In some implementations, the adapter device may associate the newly active region 624 with the third data block 610c, and then transfer data from the data associated with the addresses Ah0, Ah1, Ah2, and Ah3 to the data block 610c.

In some implementations, the adapter device may determine that a new region 624 of the address space 620 has become particularly active before an event that causes data from a data block 610 to be transferred to the address space 620. In this case, a new region 624 becoming active may be the event that causes the adapter device to transfer the data in a data block 610 to the address space 620. The adapter device need only select which data block 610 to associate with the newly active region 624. In the illustrated example, the adapter device may select the first data block 610a because the first data block 610a has the oldest data. Alternatively, the adapter device may select the third data block 610c, because the third data block 610c has had the least amount of data written to it. In various implementations, the adapter device may use other criteria to determine which data block 610 to associate with the newly active region 624, such as selecting the next data block 610 that is scheduled to have its data transferred to the address space 620, the last data block that 610 had its data transferred, or a data block 610 that has not been written to at all, among other things.

In various implementations, the adapter device may have a processor to manage the associations of data blocks 610 to regions of the address space 620. Alternatively or additionally, the adapter device may have firmware, executing on an integrated circuit, which manages the data block 610 associations. Alternatively, in some implementations, the adapter device may have a combination of purpose-built, integrated circuits performing some functions, and firmware performing other functions.

In some implementations, the adapter device may have a network interface. The network interface enables the adapter device to communicate with address spaces associated with network resources. In these implementations, the adapter device may have a translation engine, configured to translate from a host bus protocol to a network protocol or a remote storage protocol.

In some implementations, the transactions from the host device may be formatted according to a host bus protocol, while the adapter device's interface with a target device uses a storage device protocol (e.g., NVMe). In these implementations, the adapter device may include a translation engine. The translation engine may be configured to translate transactions from the host bus protocol to the storage device protocol, and vice versa.

An adapter device, as described above, may buffer write transactions that are directed to a large address space. The adapter device may buffer write transactions so that the data for the write transactions can be transferred to the address space in large blocks. In some cases, accumulating write transactions prior to transferring the data may avoid having to read some data from the target device first, modify the few bytes being written, and then write all of the data read back to the target device. Particularly active regions of a target device's address space may be buffered by the adapter device in data blocks, whose data can be quickly transferred to the target device. Write transactions that fall outside the active regions may be captured in a sequential data buffer. Data in the data buffer can be accumulated into fewer transactions to a target device. Transfers from the data buffer may require more transactions to a target device, or may require read-modify-write operations, but remapping data blocks to active regions in the target device's address space should result in more write transactions being buffered in the data blocks than in the data buffer.

Figure 7:
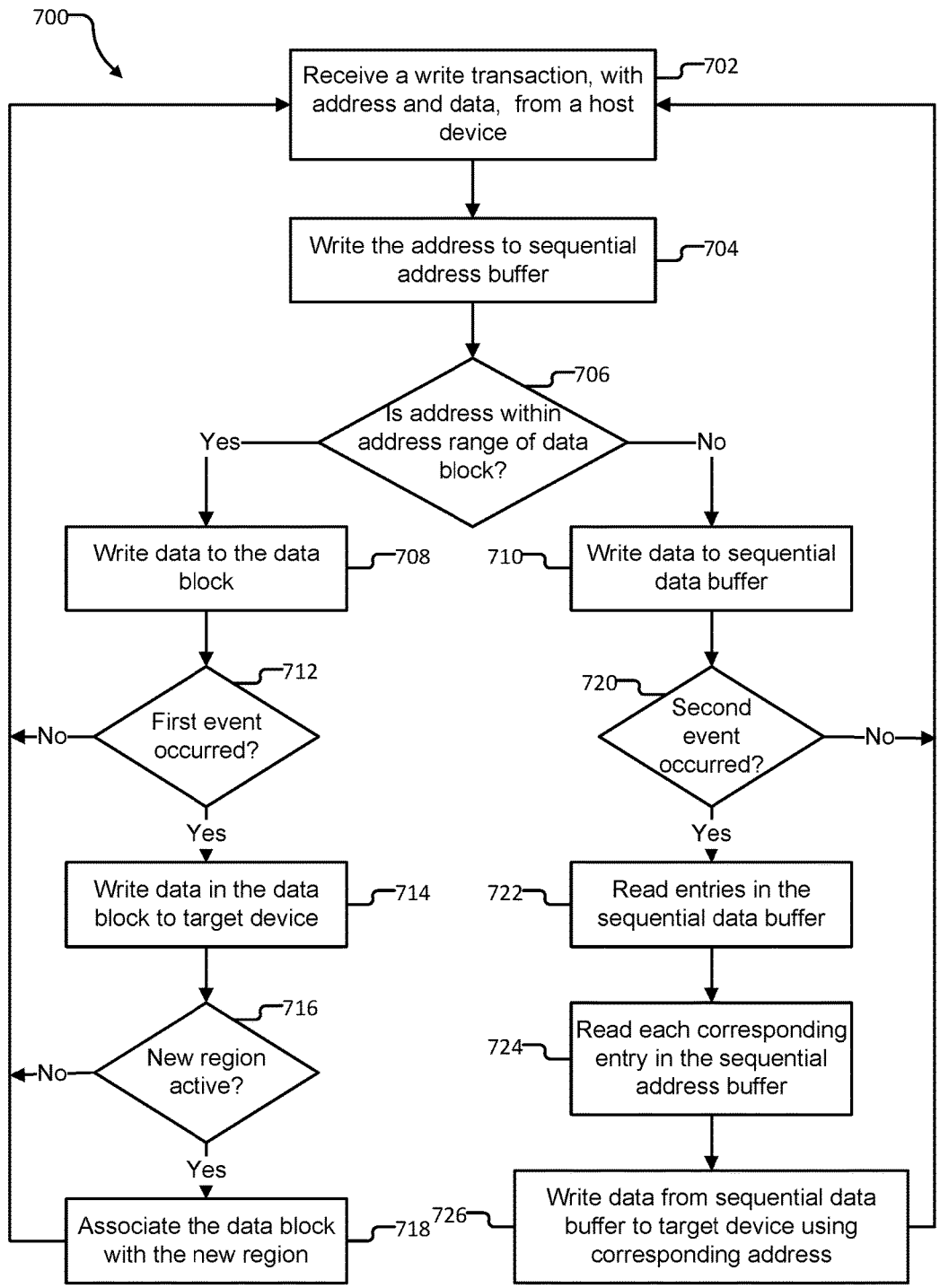
FIG. 7 illustrates an example of a process that may be executed by an adapter device configured to provide an interface between a host device and a target device with a large address space.

FIG. 7 illustrates an example of a process 700 that may be executed by an adapter device configured to provide an interface between a host device and memory-mapped I/O devices. The adapter device may be configured to buffer write transactions, and transfer the buffered data in blocks, to increase the efficiency of writes to a target device. The example process 700 illustrates the steps the adapter device may execute in buffering and transferring write transaction data.

At step 702, the adapter device may receive a write transaction from a host device. The write transaction includes an address and data. The width of the address may be determined by the size of the address space of the target device, e.g., 40 bits or 64 bits, or some other bit width. The data may be as small as a few bits or one byte, and may be as large as whatever maximum size is allowed by the host device's bus protocol.

At step 704, the adapter device may write the address to a sequential address buffer. The sequential address buffer stores the addresses from the write transactions in the order that the write transactions are received. In some implementations, the address buffer stores additional information about a transaction, such as a timestamp, the length of the data, byte enables, valid bits, a transaction type, or other information that may be provided in the write transaction. In some implementations the address buffer also stores the address where associated write data is stored in a data block.

At step 706, the adapter device may determine whether the address is within the address range of a data block. As described above, the adapter device may have one or more data blocks. Each data block may be associated with a region of the address space of a target device, meaning that the adapter device can write to a data block more or less as if writing to the target device. The data blocks thus function as a stand-in for the associated region of the target device's address space. Each data block has an address range that corresponds to its associated address space region. At step 706, the adapter device attempts to determine whether the address received with the write transaction at step 702 is within the address range of any of the data blocks. When the address is within the address range of a data block, the process 700 proceeds to step 708. Otherwise, the process proceeds to step 710.

At step 708, the adapter device may write the data received with the write transaction at step 702 into a data block. The data block is identified by having an address range that the address falls into. In some implementations, the adapter device may have a memory in which the data blocks are stored. In these implementations, the adapter device may translate the address received with the write transaction in step 702 into an address that is within the address space of the adapter device's memory. The adapter device may use this translated address to write the data into the data block at step 708. The adapter device may further store this translated address with the received address in the address buffer.

At step 712, the adapter device determines whether a first event has occurred. The first event may be, for example, expiration of at timer, the data written to a data block reaching a threshold amount, a data block being scheduled to have its data transferred to a target device, a new region of a target device's address space becoming particularly active, or some other event. When, at step 712, the adapter device determines that the first event has not occurred, the process 700 returns to step 702, and the adapter device continues to receive and process write transactions. When, at step 712, the adapter device determines that the first event has occurred, the process proceeds to step 714.

At step 714, the adapter device may write a data block to a target devices. The adapter device may select a data block from among multiple data blocks. The selection may be based on a round-robin order, or on which data block has the oldest data, or which data block has been least recently written to, or which data block has had the least amount of data written to it, or some other criteria. The adapter device may generate one or more write transactions directed to the target device, where the write transaction or transactions contain the data from the data block. The size of the data blocks may be selected to be a multiple of the minimum write transaction of the target device.

The process 700 may next proceed to step 716, where the adapter device may determine whether a new region of a target device's address space has become particularly active. The region has become particularly active when the adapter device has received some number of transactions to the region. The adapter device may examine the address buffer to determine whether some number of write transactions have been received for one region of the address space of a target device. The adapter device may be configured with a threshold, which indicates that a certain number of transactions, a certain amount of data, or an indication of a certain frequency of transactions to the region have been received, or some other criteria. When the adapter device determines that no new address space region has become particularly active, the process may return to step 702, and the adapter device may continue to receive write transactions from the host device. Otherwise, the process proceeds to step 718.

At step 708, the adapter device may associate a data block with the newly active region. The data block that is associated with the newly active region is typically a data block whose data was written to a target device at step 714, so that the data block does not have any data for new write transactions in it.

After step 718, the process returns to step 702, and the adapter device continues to receive write transactions from the host device.

Returning to step 706, when the adapter device determines that the address received with the write transaction at step 706 is outside the address ranges of the data blocks, then the process proceeds to step 710. At step 710, the adapter device may write the data received with the write transaction to a sequential data buffer. The sequential data buffer stores transaction data in the order that the data is received. Each entry in the data buffer may store the data for an individual write transaction. Thus, an entry may store as little as a few bits to as much as the maximum size provided by the host bus protocol.

At step 720, the adapter device next determines whether a second event has occurred. The second event may be that the number of entries in the data buffer has reached a threshold, that the amount of data in the data buffer has reached a threshold, that a timer has expired, that the number of entries in the address buffer has reached a threshold, that some number of addresses associated with data in the data buffer fall within the same window, or some other event. When the adapter device determines that a second event has not occurred, the process returns to step 702. Otherwise, the process proceeds to step 722.

At step 722, the adapter device may read the entries in the sequential data buffer. The adapter device may read an entry, a few entries, or all entries that have data in them. At step 724, the adapter device may read each corresponding entry in the sequential address buffer, to match the data in the data buffer with its associated address. In some implementations, the adapter device may look for addresses that are within the same window. For example, assuming that the minimum transaction size for writes to a target device is 1 KB, the adapter device may look for addresses that fall within the same 1 KB window. The adapter device may, at step 726, put the data for these addresses together into one write transaction to the target device. Otherwise, at step 726, the adapter device may write the data to the target device using the corresponding address. In some cases, this step may require that the adapter device first read data from the target device. For example, assuming that the minimum write transaction size for writes to the target device is 1 KB, the adapter device may first read 1 KB that includes the location that the data is to be written to. The adapter device may then modify the data read with the data from the data buffer, and then write back the now modified 1 KB of data.

Once the adapter device has transferred some or all of the data from the data buffer to a target device, the process 700 returns to step 702.

Figure 8:
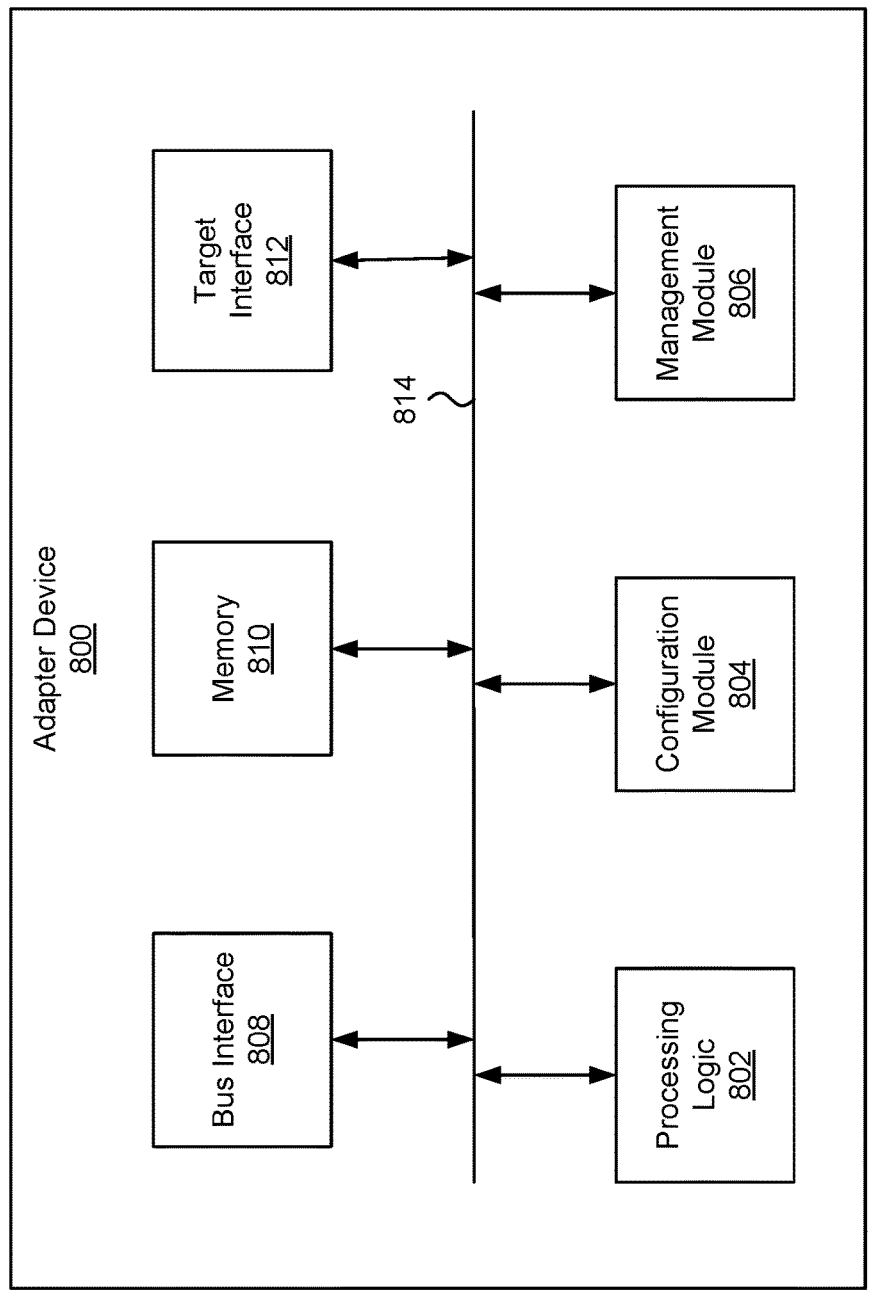
FIG. 8 illustrates an example of an adapter device.

FIG. 8 illustrates an example of an adapter device 800. Functionality and/or several components of the adapter device 800 may be used without limitation with other embodiments disclosed elsewhere in this disclosure, without limitations. An adapter device 800 may facilitate processing of packets and/or forwarding of packets from the adapter device 800 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the adapter device 800 may be the recipient and/or generator of packets. In some implementations, the adapter device 800 may modify the contents of the packet before forwarding the packet to another device. The adapter device 800 may be a peripheral device coupled to another computer device, a switch, a router or any other suitable device enabled for receiving and forwarding packets.

In one example, the adapter device 800 may include processing logic 802, a configuration module 804, a management module 806, a bus interface module 808, memory 810, and a target interface module 812. These modules may be hardware modules, software modules, or a combination of hardware and software. In certain instances, modules may be interchangeably used with components or engines, without deviating from the scope of the disclosure. The adapter device 800 may include additional modules, not illustrated here, such as components discussed with respect to the nodes disclosed in FIG. 9. In some implementations, the adapter device 800 may include fewer modules. In some implementations, one or more of the modules may be combined into one module. One or more of the modules may be in communication with each other over a communication channel 814. The communication channel 814 may include one or more busses, meshes, matrices, fabrics, a combination of these communication channels, or some other suitable communication channel.

The processing logic 802 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 802 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 802 may be stored on a computer-readable storage medium, for example, in the form of a computer program. The computer-readable storage medium may be non-transitory. In some cases, the computer-readable medium may be part of the memory 810.

The memory 810 may include either volatile or non-volatile, or both volatile and non-volatile types of memory. The memory 810 may, for example, include random access memory (RAM), read only memory (ROM), Electrically Erasable Programmable Read-Only Memory (EEPROM), flash memory, and/or some other suitable storage media. In some cases, some or all of the memory 810 may be internal to the adapter device 800, while in other cases some or all of the memory may be external to the adapter device 800. The memory 810 may store an operating system comprising executable instructions that, when executed by the processing logic 802, provides the execution environment for executing instructions providing networking functionality for the adapter device 800. The memory may also store and maintain several data structures and routing tables for facilitating the functionality of the adapter device 800.

In some implementations, the configuration module 804 may include one or more configuration registers. Configuration registers may control the operations of the adapter device 800. In some implementations, one or more bits in the configuration register can represent certain capabilities of the adapter device 800. Configuration registers may be programmed by instructions executing in the processing logic 802, and/or by an external entity, such as a host device, an operating system executing on a host device, and/or a remote device. The configuration module 804 may further include hardware and/or software that control the operations of the adapter device 800.

In some implementations, the management module 806 may be configured to manage different components of the adapter device 800. In some cases, the management module 806 may configure one or more bits in one or more configuration registers at power up, to enable or disable certain capabilities of the adapter device 800. In certain implementations, the management module 804 may use processing resources from the processing logic 802. In other implementations, the management module 806 may have processing logic similar to the processing logic 802, but segmented away or implemented on a different power plane than the processing logic 802.

The bus interface module 808 may enable communication with external entities, such as a host device and/or other components in a computing system, over an external communication medium. The bus interface module 808 may include a physical interface for connecting to a cable, socket, port, or other connection to the external communication medium. The bus interface module 808 may further include hardware and/or software to manage incoming and outgoing transactions. The bus interface module 808 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 808 may include the physical layer for any of these bus protocols, including a connector, power management, and error handling, among other things. In some implementations, the adapter device 800 may include multiple bus interface modules for communicating with multiple external entities. These multiple bus interface modules may implement the same local bus protocol, different local bus protocols, or a combination of the same and different bus protocols.

The target interface module 812 may include hardware and/or software for communicating with locally-attached or network-attached target devices. In some implementations, the target interface module 812 may implement a local bus protocol, such as PCI-based protocols, NVMe, SCSI, and so on. In some implementations, the target interface 812 module may be configured to communicate with a network. In these implementations, the target interface module 812 may, for example, include physical connectors or physical ports for wired connection to a network, and/or antennas for wireless communication to a network. The target interface module 812 may further include hardware and/or software configured to implement a network protocol stack. The target interface module 812 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the adapter device 800 may include multiple target interface modules, each configured to communicate with either local target devices, target devices on one network, and/or target devices on different networks. For example, in these implementations, the adapter device 800 may include a target interface module 812 for communicating with a wired Ethernet network, a wireless 802.11 network, a cellular network, an Infiniband network, and so on.

In various implementations, the adapter device 800 may include additional modules, not illustrated here. For example, the adapter device may include a translation module. The translation module may translate a transaction received over the bus interface 808 into a transaction that can be sent over the target interface module 812, and vice versa.

The various components and modules of the adapter device 800, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 9.

Figure 9:
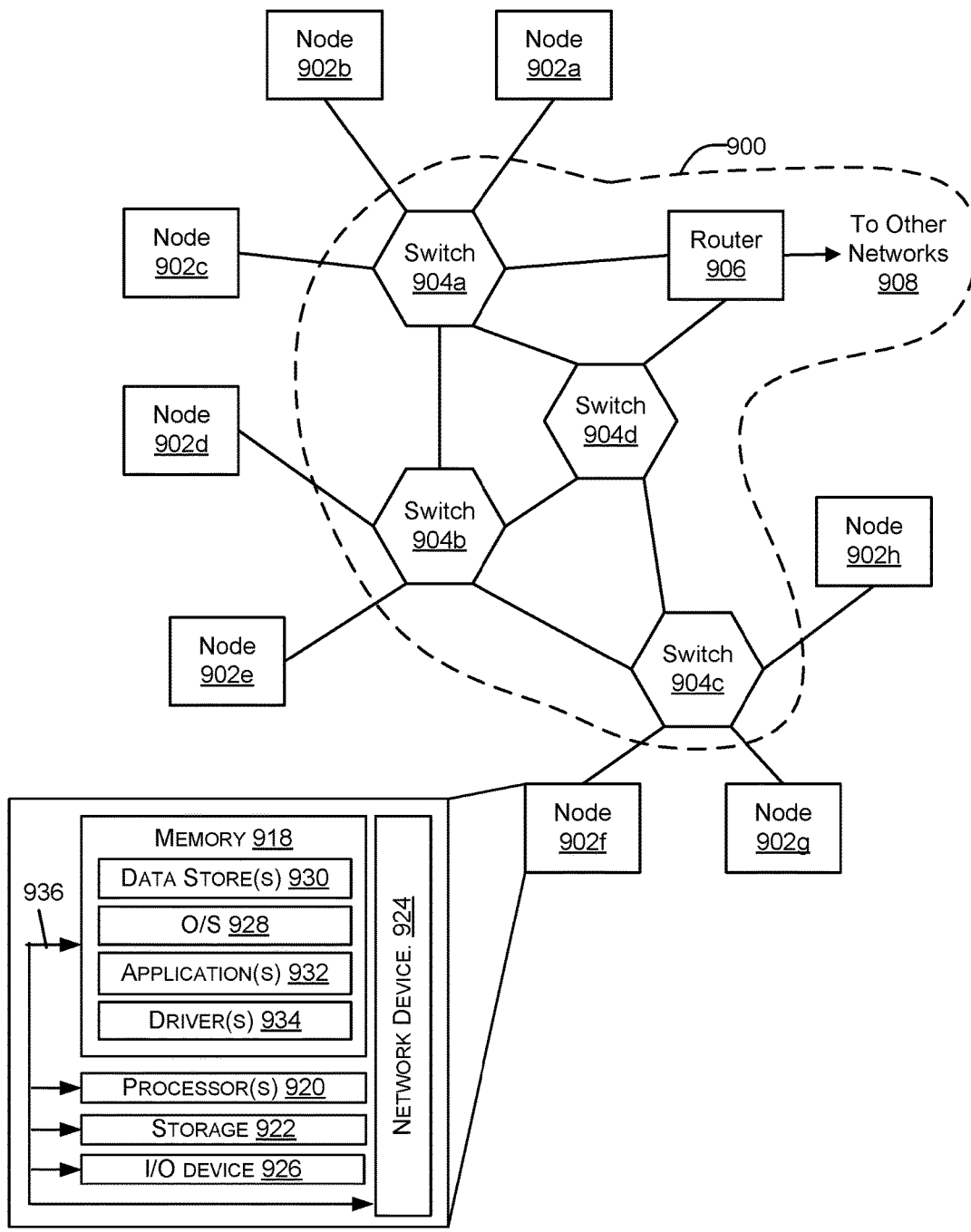
FIG. 9 illustrates a network, illustrating various different types of network device.

FIG. 9 illustrates a network 900, illustrating various different types of network devices, such as nodes comprising the network device, switches and routers. One or more of the network devices may include the adapter device 800 of FIG. 8. In certain embodiments, the network 900 may be based on a switched architecture with point-to-point links. As illustrated in FIG. 9, the network 900 includes a plurality of switches 904a-904d, which may be arranged in a network. In some cases, the switches are arranged in a multi-layered network, such as a Clos network. A network device that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 904a-904d may be connected to a plurality of nodes 902a-902h and provide multiple paths between any two nodes.

The network 900 may also include one or more network devices for connection with other networks 908, such as other subnets, LANs, wide area networks (WANs), or the Internet, and may be referred to as routers 906. Routers use headers and forwarding tables to determine the best path for forwarding the packets, and use protocols such as internet control message protocol (ICMP) to communicate with each other and configure the best route between any two devices.

In some examples, network(s) 900 may include any one or a combination of many different types of networks, such as cable networks, the Internet, wireless networks, cellular networks and other private and/or public networks. Interconnected switches 904a-904d and router 906, if present, may be referred to as a switch fabric, a fabric, a network fabric, or simply a network. In the context of a computer network, terms "fabric" and "network" may be used interchangeably herein.

Nodes 902a-902h may be any combination of host systems, processor nodes, storage subsystems, and I/O chassis that represent user devices, service provider computers or third party computers.

User devices may include computing devices to access an application 932 (e.g., a web browser or mobile device application). In some aspects, the application 932 may be hosted, managed, and/or provided by a computing resources service or service provider. The application 932 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 908. Additionally, the user device(s) may be part of the distributed system managed by, controlled by, or otherwise part of the service provider computer(s) (e.g., a console device integrated with the service provider computers).

The node(s) of FIG. 9 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 932 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 902a-902h may include at least one memory 918 and one or more processing units (or processor(s) 920). The processor(s) 920 may be implemented in hardware, computer-executable instructions, firmware, or combinations thereof. Computer-executable instruction or firmware implementations of the processor(s) 920 may include computer-executable or machine-executable instructions written in any suitable programming language to perform the various functions described.

In some instances, the hardware processor(s) 920 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 918 may store program instructions that are loadable and executable on the processor(s) 920, as well as data generated during the execution of these programs. Depending on the configuration and type of the node(s) 902a-902h, the memory 918 may be volatile (such as RAM) and/or non-volatile (such as ROM, flash memory, etc.). The memory 918 may include an operating system 928, one or more data stores 930, one or more application programs 932, one or more drivers 934, and/or services for implementing the features disclosed herein.

The operating system 928 may support nodes 902a-902h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 928 may also be a proprietary operating system.

The data stores 930 may include permanent or transitory data used and/or operated on by the operating system 928, application programs 932, or drivers 934. Examples of such data include web pages, video data, audio data, images, user data, and so on. The information in the data stores 930 may, in some implementations, be provided over the network(s) 908 to user devices 904. In some cases, the data stores 930 may additionally or alternatively include stored application programs and/or drivers. Alternatively or additionally, the data stores 930 may store standard and/or proprietary software libraries, and/or standard and/or proprietary application user interface (API) libraries. Information stored in the data stores 930 may be machine-readable object code, source code, interpreted code, or intermediate code.

The drivers 934 include programs that may provide communication between components in a node. For example, some drivers 934 may provide communication between the operating system 928 and additional storage 922, network device 924, and/or I/O device 926. Alternatively or additionally, some drivers 934 may provide communication between application programs 932 and the operating system 928, and/or application programs 932 and peripheral devices accessible to the service provider computer. In many cases, the drivers 934 may include drivers that provide well-understood functionality (e.g., printer drivers, display drivers, hard disk drivers, Solid State Device drivers). In other cases, the drivers 934 may provide proprietary or specialized functionality.

The service provider computer(s) or servers may also include additional storage 922, which may include removable storage and/or non-removable storage. The additional storage 922 may include magnetic storage, optical disks, solid state disks, flash memory, and/or tape storage. The additional storage 922 may be housed in the same chassis as the node(s) 902a-902h or may be in an external enclosure. The memory 918 and/or additional storage 922 and their associated computer-readable media may provide non-volatile storage of computer-readable instructions, data structures, program modules, and other data for the computing devices. In some implementations, the memory 918 may include multiple different types of memory, such as SRAM, DRAM, or ROM.

The memory 918 and the additional storage 922, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 918 and the additional storage 922 are examples of computer storage media. Additional types of computer storage media that may be present in the node(s) 902a-902h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 902a-902h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 902a-902h may also include I/O device(s) 926, such as a keyboard, a mouse, a pen, a voice input device, a touch input device, a display, speakers, a printer, and the like. The node(s) 902a-902h may also include one or more communication channels 936. A communication channel 936 may provide a medium over which the various components of the node(s) 902a-902h can communicate. The communication channel or channels 936 may take the form of a bus, a ring, a switching fabric, or a network.

The node(s) 902a-902h may also contain network device(s) 926 that allow the node(s) 902a-902h to communicate with a stored database, another computing device or server, user terminals and/or other devices on the network(s) 900. The network device(s) 924 of FIG. 9 may include the adapter device 800 of FIG. 8, or equivalent functionality.

In some implementations, the network device 926 is a peripheral device, such as a PCI-based device. In these implementations, the network device 926 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 808 may implement NVMe, and the network device 926 may be connected to a computing system using a PCIe interface.

A PCI-based device may include one or more functions. A "function" describes operations that may be provided by the network device 926. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 926 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable adapter device may be classified as physical functions (PFs) or virtual functions (VFs). Physical functions are fully featured functions of the device that can be discovered, managed, and manipulated. Physical functions have configuration resources that can be used to configure or control the adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 8, FIG. 9, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An adapter device comprising:
   a host interface operable to communicate with a host device;
   a target interface operable to communicate with a target device;
   a sequential address buffer;
   a sequential data buffer; and
   a memory, wherein a region of the memory is configured as a data block, wherein the data block is associated with an address range, wherein the address range corresponds to a region of an address space of the target device;
   wherein the adapter device is operable to:
      receive a first transaction at the host interface, the first transaction having a first address and first data;
      write the first address to the sequential address buffer;
      determine that the first address is within the address range;
      write the first data to the data block;
      receive a second transaction at the host interface, the second transaction having a second address and second data;
      write the second address to the sequential address buffer;
      determine that the second address is outside the address range;

write the second data to the sequential data buffer;
upon occurrence of a first event, write the first data in the data block to the region of the address space using the target interface; and
upon occurrence of a second event, read data from each entry of the sequential data buffer and, using the target interface, write the data read from each entry to the target device.

2. The adapter device of claim 1, wherein the target interface is operable to communicate with the target device using a local storage protocol.

3. The adapter device of claim 1, wherein the target interface is operable to communicate with the target device using a network protocol.

4. An adapter device comprising:
a sequential address buffer;
a sequential data buffer; and
a memory, wherein a region of the memory is configured as a data block, wherein the data block is associated with an address range, wherein the address range corresponds to a region of an address space of a target device;
wherein the adapter device is operable to:
receive a first write transaction, the first write transaction having a first address and first data;
write the first address to the sequential address buffer;
determine that the first address is within the address range;
write the first data to the data block;
upon occurrence of a first event, write the first data from the data block to the region of the address space of the target device;
receive a second write transaction, the second write transaction having a second address and second data;
write the second address to the sequential address buffer;
determine that the second address is outside the address range;
write the second data to the sequential data buffer;
upon occurrence of a second event, read third data from a first entry in the sequential data buffer;
read a third address from a second entry in the sequential address buffer, the second entry corresponding to the first entry; and
write the third data to the target device using the third address.

5. The adapter device of claim 4, wherein the second event comprises determining that an amount of data in the sequential data buffer has reached a threshold.

6. The adapter device of claim 4, wherein the second event comprises determining that a number of addresses in the sequential address buffer that have corresponding data in the sequential data buffer are within a same region of the address space of the target device.

7. The adapter device of claim 4, wherein the first event comprises determining that a pre-determined amount of time has passed.

8. The adapter device of claim 4, wherein the first event comprises determining that the data block contains a pre-determined amount of data.

9. The adapter device of claim 4, wherein the first event comprises:
determining that a number of addresses in the sequential address buffer are within another region of the address space of the target device; and
determining that the number of addresses is above a threshold.

10. The adapter device of claim 4, wherein the adapter device is further operable to modify the address range to correspond to a second region of the address space of the target device.

11. The adapter device of claim 10, wherein the adapter device is further operable to select the second region based on addresses in the sequential address buffer.

12. The adapter device of claim 4, wherein the adapter device is further operable to write information about the first write transaction into the sequential data buffer with the first address.

13. The adapter device of claim 4, wherein the adapter device is configured to examine contents of the sequential address buffer to perform an action, wherein the action includes profiling transactions associated with the contents, monitoring activity associated with the contents, pre-fetching data associated with the contents, or protecting the address space of the target device.

14. The adapter device of claim 4, further comprising:
a translation unit, wherein the translation unit is operable to translate from a host protocol to a network protocol.

15. The adapter device of claim 4, further comprising:
a translation unit, wherein the translation unit is operable to translate from a host protocol to a storage protocol.

16. The adapter device of claim 4, wherein the target device comprises a storage device, a general purpose processor, or a network resource.

17. The adapter device of claim 4, wherein a size of the region of the address space of the target device is less than a size of the address space of the target device.

18. An adapter device, comprising:
a sequential address buffer; and
a sequential data buffer;
wherein the adapter device is operable to communicate with a host device and a target device, and wherein the adapter device is operable to:
receive a write transaction from the host device, the write transaction having an address and data, wherein the write transaction is directed to the target device;
write the address to the sequential address buffer;
write the data to the sequential data buffer; and
upon occurrence of an event:
read first data from a first entry in the sequential data buffer;
read a first address from second entry in the sequential address buffer, wherein the second entry corresponds to the first entry due to the first address being associated with the first data;
write the first data to the target device using the first address;
determine that the first address is within a region of an address space of the target device;
determine that other addresses included in other entries in the sequential address buffer are within the region of the address space of the target device;
extract additional data from entries in the sequential data buffer, wherein the additional data is associated with the other addresses; and
write the additional data to the target device, wherein the first data is written with the additional data.

19. A method comprising:
receiving, at an adapter device, a first write transaction from a host device, the first write transaction having first address and first data, wherein the adapter device includes a sequential address buffer and a memory, wherein a first region of the memory is configured as a sequential data buffer and a second region of the memory is configured as a data block, the data block having an address range, wherein the address range corresponds to a region of memory of a target device;

writing, by the adapter device, the first address to the sequential address buffer;

determining that the first address is within the address range;

writing the first data to the data block;

receiving a second transaction from the host device, the second transaction having a second address and second data;

writing the second address to the sequential address buffer;

determining that the second address is outside the address range;

writing the second data to the sequential data buffer;

upon occurrence of a first event, writing the first data to the region of memory of the target device; and upon occurrence of a second event, reading data from each entry of the sequential data buffer and writing the data read from each entry to the target device using an address from a corresponding entry in the sequential address buffer.

20. The method of claim 19, wherein the second event comprises determining that an amount of data in the sequential data buffer has reached a threshold.

21. The method of claim 19, wherein the second event comprises determining that a number of addresses in the sequential data buffer that have corresponding data in the sequential data buffer are within a same region of the memory of the target device.

22. The method of claim 19, wherein the first event comprises determining that a pre-determined amount of time has passed.

23. The method of claim 19, wherein the first event comprises determining that the data block contains a pre-determined amount of data.

24. The method of claim 19, wherein the first event comprises:

determining that a number of addresses in the sequential address buffer are within another region of the memory of the target device; and determining that the number of addresses is above a threshold.

* * * * *